United States Patent
Kuo (10) Patent No.: US 9,692,961 B2
(45) Date of Patent: Jun. 27, 2017

(54) ELECTRONIC DEVICE AND VIRTUAL IMAGE ROTATION METHOD

(71) Applicant: FIH (HONG KONG) LIMITED, Kowloon (HK)

(72) Inventor: San-Hsin Kuo, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 38 days.

(21) Appl. No.: 14/695,529

(22) Filed: Apr. 24, 2015

(65) Prior Publication Data

US 2016/0127639 A1    May 5, 2016

(30) Foreign Application Priority Data

Oct. 30, 2014    (TW) ............................. 103137538 A (51) Int. Cl.
*H04N 5/232*    (2006.01)

(52) U.S. Cl.
CPC ..... *H04N 5/23219* (2013.01); *H04N 5/23293* (2013.01)

(58) Field of Classification Search
CPC ....................... H04N 5/23219; H04N 5/23291
See application file for complete search history.

(56) References Cited

U.S. PATENT DOCUMENTS

2015/0085076 A1*    3/2015    Lockhart ............ H04N 13/0468
348/46

FOREIGN PATENT DOCUMENTS

TW            201403454 A        1/2014

* cited by examiner

*Primary Examiner* — Tuan Ho
(74) *Attorney, Agent, or Firm* — Steven Reiss (57) ABSTRACT

A virtual image rotation method activates a camera to capture an image on a first side of an electronic device, analyzes the captured image to identify one or more facial images from the captured image, and identifies one of the one or more facial images from the captured image as a primary facial image. The method further calculates a directional value of the primary facial image in the captured image, and rotates a virtual image displayed on a display screen based on a preset rotational value associated with a preset directional value range in which the directional value of the primary facial image falls. A related electronic device and a related non-transitory storage medium are provided.

15 Claims, 5 Drawing Sheets

ELECTRONIC DEVICE AND VIRTUAL IMAGE ROTATION METHOD

CROSS-REFERENCE TO RELATED APPLICATIONS

This application claims priority to Taiwanese Patent Application No. 103137538 filed on Oct. 30, 2014, the contents of which are incorporated by reference herein.

FIELD

The subject matter herein generally relates to electronic devices, and particularly, to an electronic device capable of automatically rotating a virtual image.

BACKGROUND

Some electronic devices employ gravity sensors to automatically rotate virtual images displayed on display screens when the display screens of the electronic devices are rotated. However, sometimes, the rotational values of the display screens of the electronic devices and the rotational values of the virtual images displayed on the display screens are not consistent.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

In general, the word "module," as used herein, refers to logic embodied in hardware or firmware, or to a collection of software instructions, written in a programming language. The software instructions in the modules can be embedded in firmware, such as in an erasable programmable read-only memory (EPROM) device. The modules described herein can be implemented as either software and/or hardware modules and can be stored in any type of computer-readable medium or other storage device. The term "comprising" means "including, but not necessarily limited to"; it specifically indicates open-ended inclusion or membership in a so-described combination, group, series and the like.

Embodiments of the present disclosure will be described in relation to the accompanying drawings.

Figure 1:
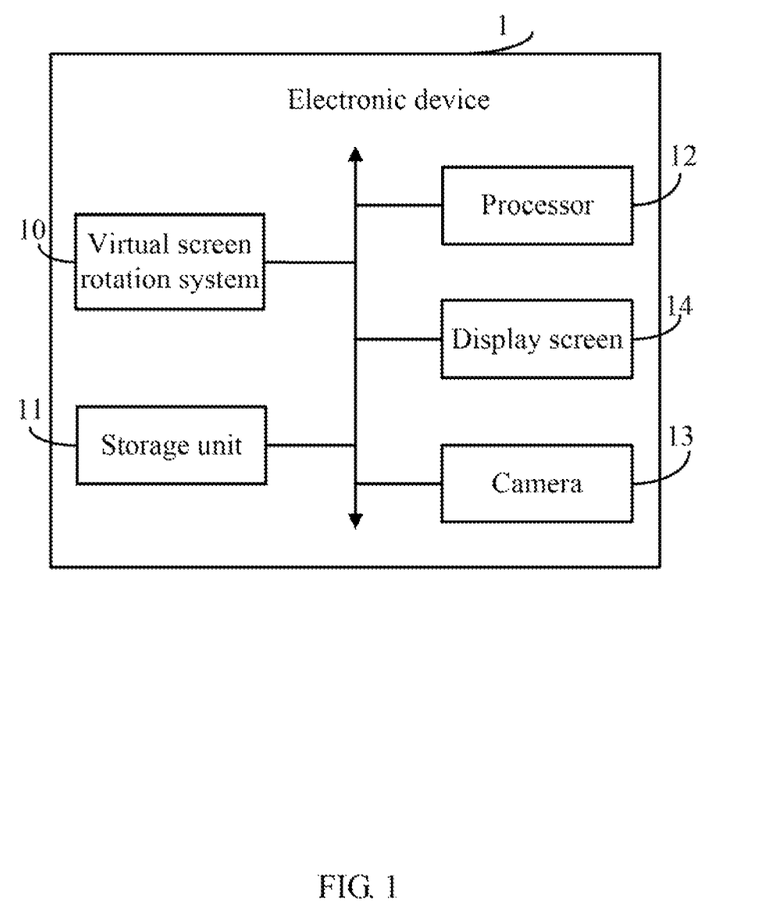
FIG. 1 is a block diagram showing an embodiment of an electronic device.

FIG. 1 illustrates an embodiment of an electronic device 1. In the embodiment, the electronic device 1 can be a portable electronic device, such as a smart phone, a tablet computer, a personal digital assistant, an E-book, or the like. The electronic device 1 can include, but is not limited to, a storage unit 11, a processor 12, a camera 13, and a display screen 14. In the embodiment, the storage unit 11 can be a hard disk, a compact disk, or a flash memory, for example. The flash memory can be a smart media (SM) card, a compact flash (CF) card, a secure digital (SD) card, an xd-picture (XD) card, or the like. In the embodiment, the storage unit 11 can store an open source computer vision (OpenCV). The OpenCV can be a library of programming functions mainly aimed at real-time computer vision. It can be a prior art and focus mainly on real-time image processing. The OpenCV can run on Windows®, Android®, iOS®, OSX®, and the like. The OpenCV can include a face database storing a number of face images. In the embodiment, the storage unit 11 can further store one or more preset rotational values, with each rotational value associated with a preset directional value range. In the embodiment, when the preset directional value range is a half open interval [45°, 135°), the rotational value is 0 degrees. When the preset directional value range is a half open interval [135°, 225°), the rotational value is 90 degrees counterclockwise. When the preset directional value range is a half open interval [225°, 315°), the rotational value is 180 degrees clockwise. When the preset directional value range is equal to a half open interval [0°, 45°) or a half open interval [315°, 360°), the rotational value is 90 degrees clockwise.

The processor 12 can be a central processing unit, a digital signal processor, or a single chip, for example. The camera 13 can be configured to capture images on a first side of the electronic device. The display screen 14 can be a liquid crystal display, an organic light-emitting diode, or the like. The display screen 14 can be configured to display a virtual image. The electronic device 1 can include a window coordinate system which rotates together with the rotation of the display screen 14 of the electronic device 1. When the display screen 14 is in a natural state, the origin of the window coordinate system can be a top left corner of the display screen 14, the X axis of the window coordinate system can be the rightward direction from the origin, and the Y axis of the window coordinate system can be the downward direction from the origin.

In the embodiment, the electronic device 1 can activate the camera 13 to capture an image on the first side of the electronic device, identify a primary facial image according to the captured image, calculate a directional value of the primary facial image in the captured image, and rotate the virtual image displayed on the display screen according to the directional value of the primary facial image.

Figure 2:
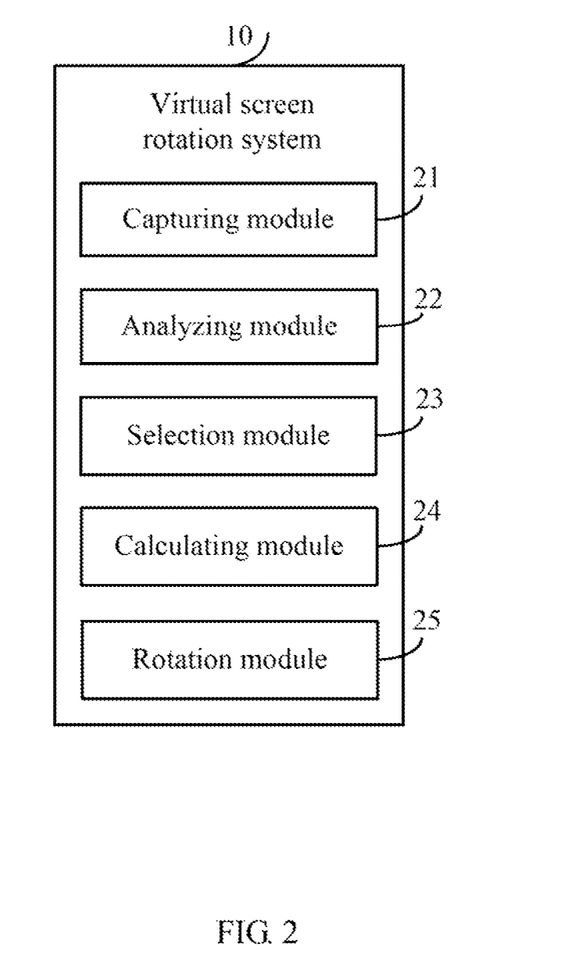
FIG. 2 is a block diagram showing an embodiment of a virtual image rotation system.

In the embodiment, the electronic device 1 can further include a virtual image rotation system 10. FIG. 2 illustrates an embodiment of the virtual image rotation system 10. In the embodiment, the virtual image rotation system 10 can include a capturing module 21, an analyzing module 22, a selection module 23, a calculating module 24, and a rotation module 25. One or more programs of the function modules can be stored in the storage unit 11 and executed by the processor 12.

In the embodiment, the capturing module 21 can be configured to activate the camera 13 to capture the image on the first side of the electronic device 1. In the embodiment, the capturing module 21 can be configured to activate the camera 13 to capture the image on the first side of the electronic device 1 at predetermined time interval.

In the embodiment, the analyzing module 22 can be configured to analyze the captured image to identify one or more facial images in the captured image. In the embodiment, the analyzing module 22 can be configured to employ the OpenCV to analyze the captured image to identify one or more facial images in the captured image.

The selection module 23 can be configured to identify one of the one or more facial images in the captured image as a primary facial image. In detail, when the number of facial images is one, the selection module 23 can identify that the facial image uniquely appearing in the captured image is the primary facial image. When the number of facial images is more than one, the selection module 23 can identify the facial image which is most similar to face images of the face database of the OpenCV from all the facial images to be the primary facial image.

The calculating module 24 can be configured to calculate the directional value of the primary facial image in the captured image.

Figure 3:
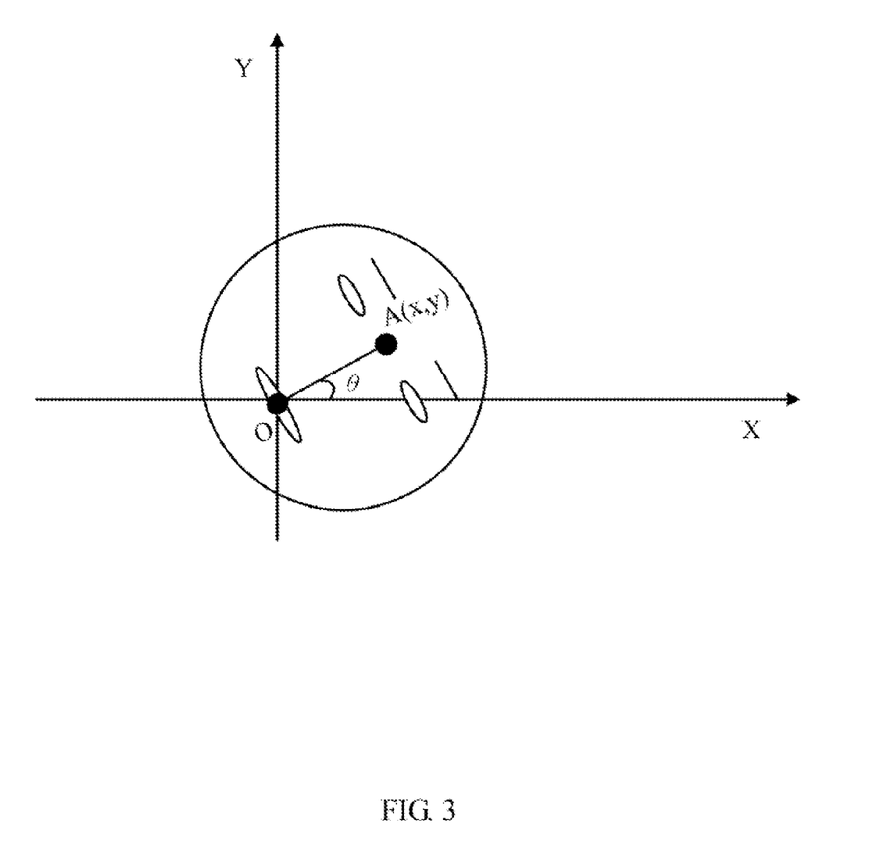
FIG. 3 is a perspective view showing how to determine a directional value of a primary facial image.

In detail, as shown in FIG. 3, the calculating module 24 can be configured to establish a virtual coordinate system: where an origin of the virtual coordinate system is a center of the mouth of the primary facial image; the X axis of the virtual coordinate system is parallel with and in a same direction with the X axis of the window coordinate system; and the Y axis of the virtual coordinate system is parallel with and in an opposite direction with the Y axis of the window coordinate system. In the embodiment, the virtual coordinate system can be a Descartes coordinate system. The calculating module 24 can be configured to map the position between two eyes of the primary facial image into the virtual coordinate system to be a target point, form a substantially straight line between the target point and the origin, determine an angle between the straight line and the horizontal axis of the virtual coordinate system according to a formula $$\theta = A\tan 2(x,y) * 180/\pi;$$

where $\theta$ is the angle between the straight line and the X axis of the virtual coordinate system; (x, y) is a set of coordinates of the target point; $\pi$ is a ratio of the circumference of a circle to its diameter; and $$\text{Atan2}(x, y) = \begin{cases} \arctan(x/y) & y > 0 \\ \arctan(x/y) + \pi & x \geq 0, y < 0 \\ \arctan(x/y) - \pi & x < 0, y < 0 \\ +\pi/2 & x > 0, y = 0 \\ -\pi/2 & x < 0, y = 0 \\ \text{undefined} & y = 0, y = 0 \end{cases}$$

The calculating module 24 can be further configured to determine the directional value of the primary facial image to be the angle between the straight line and the X axis of the virtual coordinate system.

The rotation module 25 can be configured to rotate a virtual image displayed on the display screen based on the preset rotational value associated with the preset directional value range in which the calculated directional value of the primary facial image falls.

Figure 4:
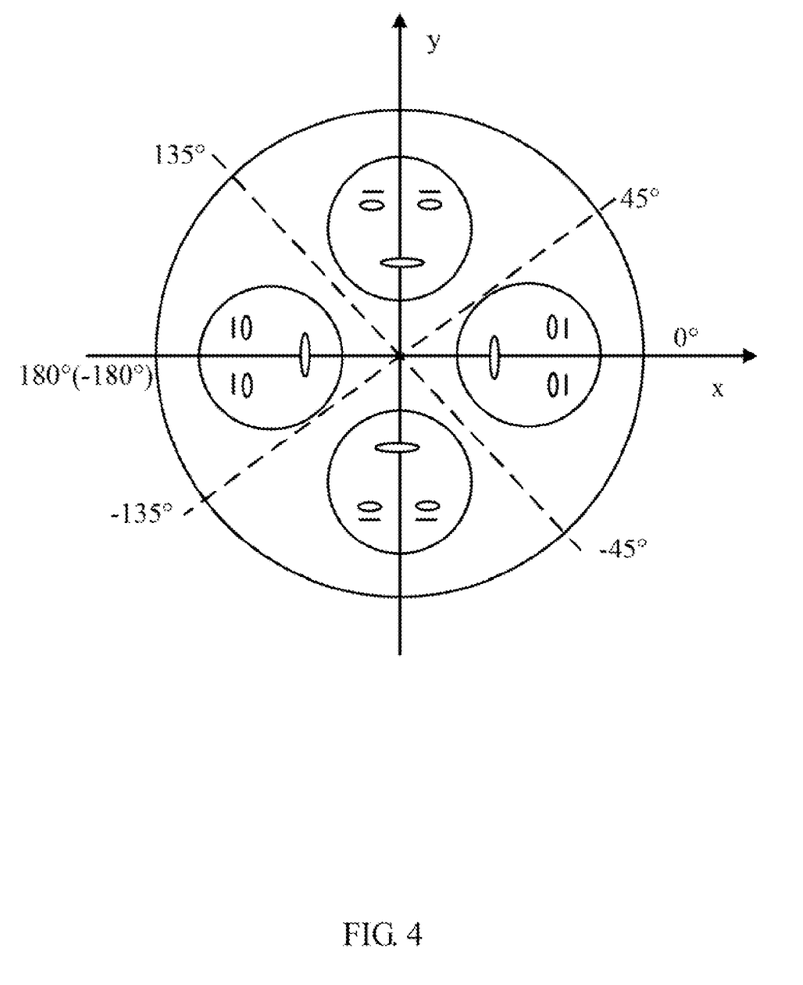
FIG. 4 is a perspective view showing how to rotate a virtual image displayed on a display screen of FIG. 1.

In detail, the rotation module 25 can be configured to determine which preset directional value range that the calculated directional value of the primary facial image falls into, determine the preset rotational value associated with the determined preset directional value range, and rotate the virtual image displayed on the display screen with the determined rotational value. That is, as shown in FIG. 4, when the directional value of the primary facial image falls into the preset directional value range [45°, 135°], the rotation module 25 prevents the rotation of the virtual image. When the directional value of the primary facial image falls into the directional value range [135°, 225°], the rotation module 25 can rotate the virtual image 90 degrees counterclockwise. When the directional value of the primary facial image falls into the preset directional value range [225°, 315°], the rotation module 25 can rotate the virtual image 180 degrees clockwise. When the directional value of the primary facial image falls into the preset directional value range [0°, 45°] or the preset directional value range [315°, 360°], the rotation module 25 can rotate the virtual image 90 degrees clockwise.

Figure 5:
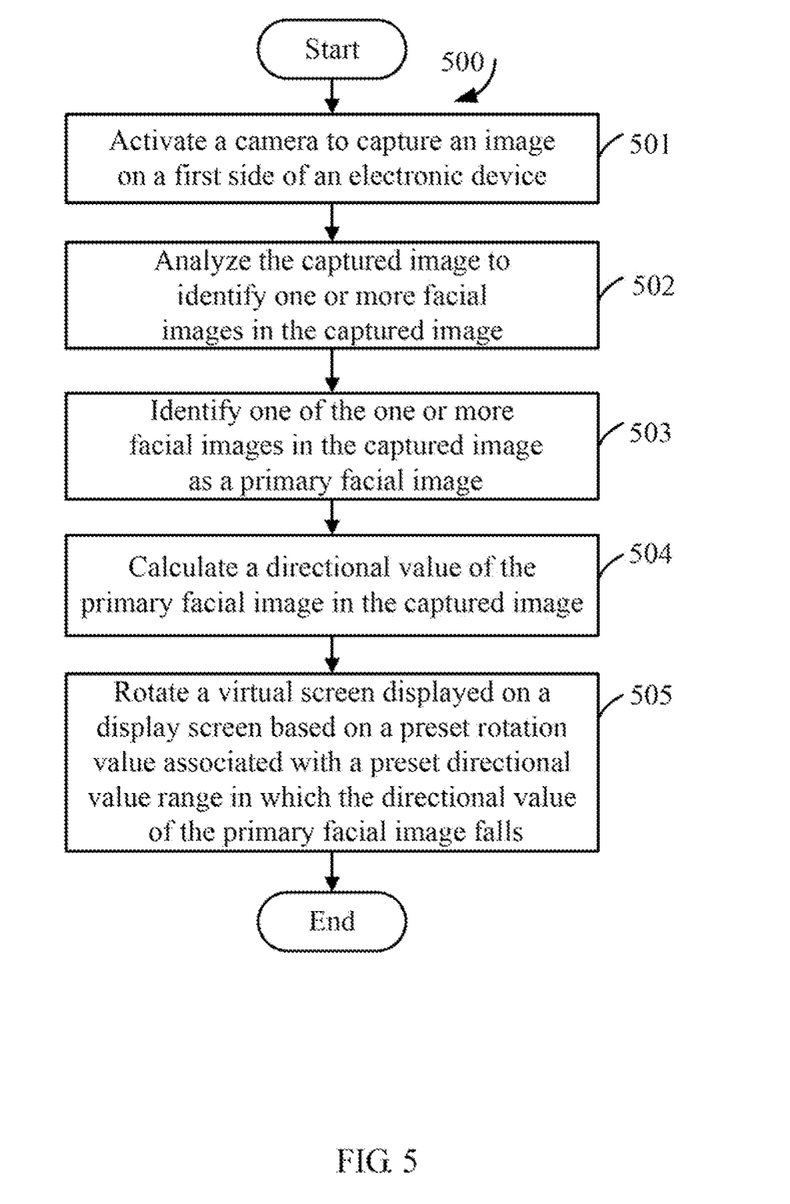
FIG. 5 is a flowchart showing an embodiment of a virtual image rotation method.

FIG. 5 illustrates an embodiment of a virtual image rotation method 500. In the embodiment, the method 500 is provided by way of example, as there are a variety of ways to carry out the method 500. The method 500 described below can be carried out using the configurations illustrated in FIGS. 1 and 2, for example, and various elements of these figures are referenced in the explanation of the method 500. Each block shown in FIGS. 1 and 2 represents one or more processes, methods, or subroutines carried out in the method. Additionally, the illustrated order of blocks is by example only and the order of the blocks can change. The method 500 can begin at block 501.

At block 501, a capturing module activates a camera to capture an image on a first side of an electronic device. In the embodiment, the capturing module activates the camera to capture the image on the first side of the electronic device at predetermined time interval.

At block 502, an analyzing module analyzes the captured image to identify one or more facial images in the captured image. In the embodiment, the analyzing module employs an OpenCV to analyze the captured image to identify one or more facial images in the captured image.

At block 503, a selection module identifies one of the one or more facial images in the captured image as a primary facial image. In detail, when the number of facial images is one, the selection module identifies that the facial image uniquely appearing in the captured image is the primary facial image, and when the number of facial images is more than one, the selection module identifies the facial image which is most similar to face images of a face database of the OpenCV from all the facial images to be the primary facial image.

At block 504, a calculating module calculates a directional value of the primary facial image in the captured image. In detail, the calculating module establishes a virtual coordinate system: where an origin of the virtual coordinate system is a center of the mouth of the primary facial image; the X axis of the virtual coordinate system is parallel with and in a same direction with the X axis of the window coordinate system; and the Y axis of the virtual coordinate system is parallel with and in an opposite direction with the Y axis of the window coordinate system. The calculating module maps the position between two eyes of the primary facial image into the virtual coordinate system to be a target point, forms a straight line between the target point and the origin, and determines an angle between the straight line and the X axis of the virtual coordinate system according to a formula:

$$\theta = A\tan 2(x,y)*180/\pi;$$

where θ is the angle between the straight line and the X axis of the virtual coordinate system; (x, y) is a set of coordinates of the target point; π is a ratio of the circumference of a circle to its diameter; and $$A\tan2(x, y) = \begin{cases} \arctan(x/y) & y > 0 \\ \arctan(x/y) + \pi & x \geq 0, y < 0 \\ \arctan(x/y) - \pi & x < 0, y < 0 \\ +\pi/2 & x > 0, y = 0 \\ -\pi/2 & x < 0, y = 0 \\ \text{undefined} & y = 0, y = 0 \end{cases}$$

The calculating module further determines the directional value of the primary facial image to be the angle between the straight line and the x axis of the virtual coordinate system.

At block 505, a rotation module rotates a virtual image displayed on the display screen based on the preset rotational value associated with the preset directional value range in which the calculated directional value of the primary facial image falls. In detail, the rotation module determines which preset directional value range that the calculated directional value of the primary facial image falls into, determines the preset rotational value associated with the determined preset directional value range, and rotates the virtual image displayed on the display screen with the determined rotational value. That is, when the directional value of the primary facial image falls into a preset directional value range [45°, 135°), the rotation module prevents the rotation of the virtual image. When the directional value of the primary facial image falls into a preset directional value range [135°, 225°), the rotation module rotates the virtual image 90 degrees counterclockwise. When the directional value of the primary facial image falls into a preset directional value range [225°, 315°), the rotation module rotates the virtual image 180 degrees clockwise. When the directional value of the primary facial image falls into a preset directional value range [0°, 45°) or a preset directional value range [315°, 360°), the rotation module rotates the virtual image 90 degrees clockwise.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
   a processor;
   a camera configured to capture images from a first side of the electronic device;
   a display screen configured to display a virtual image; and
   a non-transitory computer readable medium;
   wherein, the non-transitory computer readable medium stores one or more preset rotational values, with each rotational value associated with a preset directional value range; and
   wherein, the non-transitory computer readable medium stores instructions for the processor to:
   activate the camera to capture an image on the first side of the electronic device;
   analyze the captured image to identify one or more facial images in the captured image;
   identify one of the one or more facial images in the captured image as a primary facial image;
   calculate a directional value of the primary facial image in the captured image;
   establish a virtual coordinate system: where an origin of the virtual coordinate system is a center of a mouth of the primary facial image; an X axis of the virtual coordinate system is parallel with and in a same direction with an X axis of a window coordinate system; and a Y axis of the virtual coordinate system is parallel with and in an opposite direction with a Y axis of the window coordinate system;
   map a position between two eyes of the primary facial image into the virtual coordinate system to be a target point;
   form a straight line between the target point and the origin and determine an angle between the straight line and the X axis of the virtual coordinate system;
   determine the directional value of the primary facial image to be the angle between the straight line and the X axis of the virtual coordinate system; and
   rotate the virtual image displayed on the display screen based on the preset rotational value associated with the preset directional value range in which the calculated directional value of the primary facial image falls.

2. The electronic device as described in claim 1, wherein the non-transitory computer readable medium stores instructions for the processor to employ an open source computer vision to analyze the image to identify the one or more facial images from the captured image.

3. The electronic device as described in claim 1, wherein the non-transitory computer readable medium stores instructions for the processor to:
   identify that the facial image uniquely appearing in the captured image is the primary facial image when the number of the facial images is one; and
   identify the facial image which is most similar to face images of a face database of an open source computer vision from all the facial images to be the primary facial image when the number of the facial images is more than one.

4. The electronic device as described in claim 1, wherein the non-transitory computer readable medium stores instructions for the processor to:
   determine which preset directional value range that the calculated directional value of the primary facial image falls into, determine the preset rotational value associated with the determined preset directional value range, and rotate the virtual image displayed on the display screen with the determined rotational value.

5. The electronic device as described in claim 4, wherein the non-transitory computer readable medium stores instructions for the processor to:
   prevent a rotation of the virtual image when the directional value of the primary facial image falls into a preset directional value range [45°, 135°);

rotate the virtual image 90 degrees counterclockwise when the directional value of the primary facial image falls into a preset directional value range [135°, 225°);

rotate the virtual image 180 degrees clockwise when the directional value of the primary facial image falls into a preset directional value range [225°, 315°); and rotate the virtual image 90 degrees clockwise when the directional value of the primary facial image falls into a preset directional value range [0°, 45°) or a preset directional value range [315°, 360°).

6. A virtual image rotation method comprising:

activating a camera to capture an image on a first side of an electronic device;

analyzing the captured image to identify one or more facial images in the captured image;

identifying one of one or more facial images as a primary facial image;

calculating a directional value of the primary facial image in the captured image;

establishing a virtual coordinate system: where an origin of the virtual coordinate system is a center of a mouth of the primary facial image; an X axis of the virtual coordinate system is parallel with and in a same direction with an X axis of the window coordinate system; and a Y axis of the virtual coordinate system is parallel with and in an opposite direction with a Y axis of the window coordinate system;

mapping a position between two eyes of the primary facial image into the virtual coordinate system to be a target point;

forming a straight line between the target point and the origin and determining an angle between the straight line and the X axis of the virtual coordinate system;

determining the directional value of the primary facial image to be the angle between the straight line and the X axis of the virtual coordinate system; and rotating a virtual image displayed on a display screen based on a preset rotational value associated with a preset directional value range in which the calculated directional value of the primary facial image falls.

7. The virtual image rotation method as described in claim 6, wherein the method further comprises:

employing an open source computer vision to analyze the captured image to identify the one or more facial images in the captured image.

8. The virtual image rotation method as described in claim 6, wherein the method further comprises:

identifying that the facial image uniquely appearing in the captured image is the primary facial image when the number of the facial images is one; and identifying the facial image which is most similar to face images of a face database of an open source computer vision from all the facial images to be the primary facial image when the number of the facial images is more than one.

9. The virtual image rotation method as described in claim 6, wherein the method further comprises:

determining which preset directional value range that the directional value of the primary facial image falls into;

determining the rotational value associated with the determined preset directional value range; and rotating the virtual image displayed on the display screen with the determined rotational value.

10. The virtual image rotation method as described in claim 9, wherein the method further comprises:

preventing a rotation of the virtual image when the directional value of the primary facial image falls into a preset directional value range [45°, 135°);

rotating the virtual image 90 degrees counterclockwise when the directional value of the primary facial image falls into a preset directional value range [135°, 225°);

rotating the virtual image 180 degrees clockwise when the directional value of the primary facial image falls into a preset directional value range [225°, 315°); and rotating the virtual image 90 degrees clockwise when the directional value of the primary facial image falls into a preset directional value range [0°, 45°) or a preset directional value range [315°, 360°).

11. A non-transitory storage medium storing a set of instructions, the set of instructions capable of being executed by a processor of an electronic device, causing the electronic device to perform a virtual image rotation method, the method comprising:

activating a camera to capture an image on a first side of an electronic device;

analyzing the captured image to identify one or more facial images in the captured image;

identifying one of one or more facial images as a primary facial image;

calculating a directional value of the primary facial image in the captured image;

establishing a virtual coordinate system: where an origin of the virtual coordinate system is a center of a mouth of the primary facial image; an X axis of the virtual coordinate system is parallel with and in a same direction with an X axis of the window coordinate system; and a Y axis of the virtual coordinate system is parallel with and in an opposite direction with a Y axis of the window coordinate system;

mapping a position between two eyes of the primary facial image into the virtual coordinate system to be a target point;

forming a straight line between the target point and the origin and determining an angle between the straight line and the X axis of the virtual coordinate system;

determining the directional value of the primary facial image to be the angle between the straight line and the X axis of the virtual coordinate system; and rotating a virtual image displayed on a display screen based on a preset rotational value associated with a preset directional value range in which the calculated directional value of the primary facial image falls.

12. The non-transitory storage medium as described in claim 11, wherein the method further comprises:

employing an open source computer vision to analyze the captured image to identify the one or more facial images in the captured image.

13. The non-transitory storage medium as described in claim 11, wherein the method further comprises:

identifying that the facial image uniquely appearing in the captured image is the primary facial image when the number of the facial images is one; and identifying the facial image which is most similar to face images of a face database of an open source computer vision from all the facial images to be the primary facial image when the number of the facial images is more than one.

14. The non-transitory storage medium as described in claim 11, wherein the method further comprises:

determining which preset directional value range that the directional value of the primary facial image falls into;

determining the rotational value associated with the determined preset directional value range; and rotating the virtual image displayed on the display screen with the determined rotational value.

15. The non-transitory storage medium as described in claim 14, wherein the method further comprises:

preventing a rotation of the virtual image when the directional value of the primary facial image falls into a preset directional value range [45°, 135°);

rotating the virtual image 90 degrees counterclockwise when the directional value of the primary facial image falls into a preset directional value range [135°, 225°);

rotating the virtual image 180 degrees clockwise when the directional value of the primary facial image falls into a preset directional value range [225°, 315°); and rotating the virtual image 90 degrees clockwise when the directional value of the primary facial image falls into a preset directional value range [0°, 45°) or a preset directional value range [315°, 360°).

* * * * *